United States Patent
Neyer et al.

(10) Patent No.: US 10,266,218 B2
(45) Date of Patent: Apr. 23, 2019

(54) TRACKED CHASSIS AND WORK MACHINE HAVING A TRACK DRIVE

(71) Applicant: Liebherr-Mining Equipment Colmar SAS, Colmar (FR)

(72) Inventors: Frédéric Neyer, Mulhouse (FR); Vincent Dreyer, Soultz (FR); Oliver Weiß, Ammerschwihr (FR)

(73) Assignee: Liebherr-Mining Equipment Colmar SAS, Colmar (FR)

( * ) Notice: Subject to any disclaimer, the term of this patent is extended or adjusted under 35 U.S.C. 154(b) by 406 days.

(21) Appl. No.: 14/995,825

(22) Filed: Jan. 14, 2016

(65) Prior Publication Data

US 2016/0288847 A1    Oct. 6, 2016

(30) Foreign Application Priority Data

Jan. 15, 2015    (DE) .................. 10 2015 000 485

(51) Int. Cl.
| | |
|---|---|
| *B62D 55/14* | (2006.01) |
| *B62D 55/20* | (2006.01) |
| *B62D 55/21* | (2006.01) |
| *B66C 9/00* | (2006.01) |
| *E02F 9/02* | (2006.01) |

(52) U.S. Cl.
CPC ............ *B62D 55/14* (2013.01); *B62D 55/20* (2013.01); *B62D 55/202* (2013.01); *B62D 55/21* (2013.01); *B66C 9/00* (2013.01); *E02F 9/02* (2013.01)

(58) Field of Classification Search
CPC ................................ B62D 55/14; B62D 55/15
See application file for complete search history.

(56) References Cited

U.S. PATENT DOCUMENTS

| | | | | |
|---|---|---|---|---|
| 5,704,697 A | * | 1/1998 | Ketting | B62D 55/12 305/193 |
| 6,929,335 B2 | * | 8/2005 | Colwell | B62D 55/14 305/194 |
| 9,376,149 B2 | * | 6/2016 | Hakes | B62D 55/14 |
| 9,409,613 B2 | * | 8/2016 | Hakes | B62D 55/202 |
| 2009/0102281 A1 | | 4/2009 | Diekevers et al. | |
| 2013/0342006 A1 | | 12/2013 | Kunigk | |
| 2016/0185404 A1 | * | 6/2016 | Westoby | B62D 55/14 305/201 |

FOREIGN PATENT DOCUMENTS

| | | |
|---|---|---|
| DE | 93 01 814 U1 | 4/1993 |
| DE | 42 38 794 A1 | 5/1994 |
| DE | 694 00 959 T2 | 5/1997 |
| DE | 101 13 412 A1 | 10/2002 |
| DE | 20 2008 008063 U1 | 9/2008 |
| DE | 10 2011 003360 U1 | 5/2011 |
| DE | 10 2011 012711 B3 | 7/2012 |
| WO | 2014/052586 A1 | 4/2014 |

* cited by examiner

*Primary Examiner* — Jason R Bellinger
(74) *Attorney, Agent, or Firm* — Dilworth & Barrese, LLP

(57) ABSTRACT

A tracked chassis for a working machine has a track which includes at least one roller path, preferably two roller paths extending in parallel, on whose running surface at least one plain roller of the tracked chassis is movable during crawler operation. The running surface of at least one roller path of the track and the running surface of at least one roller have a transverse section with an at least sectionally convex contour.

16 Claims, 7 Drawing Sheets

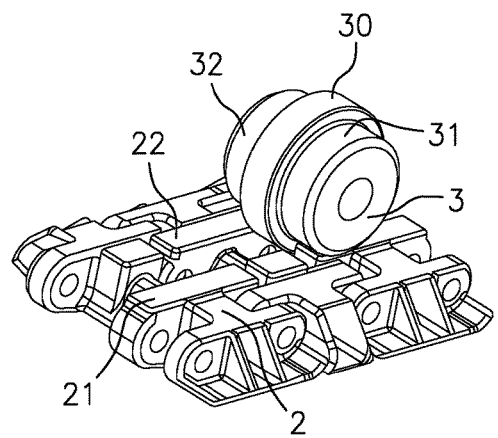
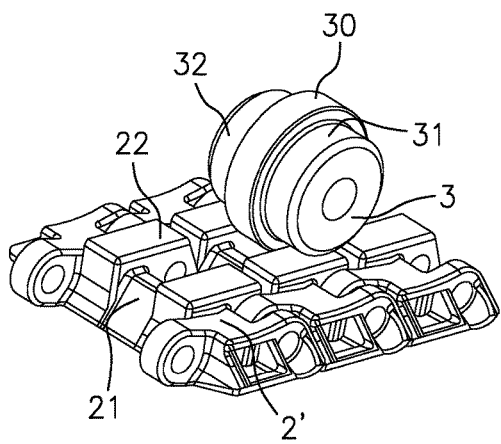
FIG. 7A          FIG. 7B
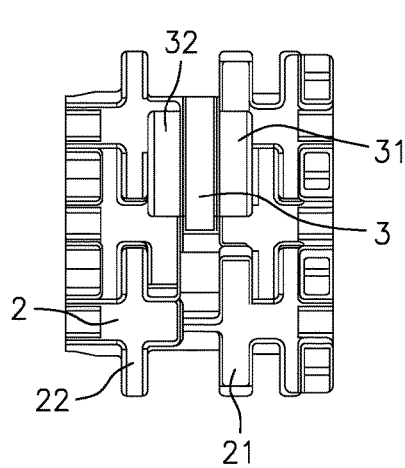
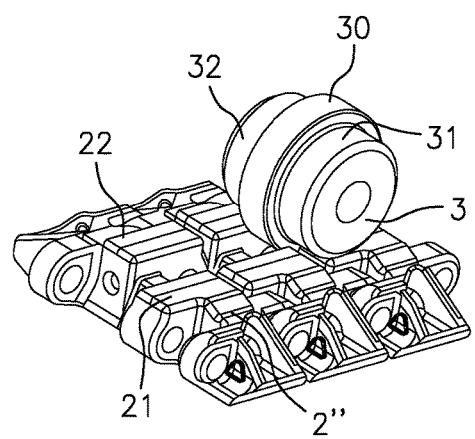
FIG. 7D          FIG. 7C

TRACKED CHASSIS AND WORK MACHINE HAVING A TRACK DRIVE

BACKGROUND OF THE INVENTION

The invention relates to a tracked chassis for a work machine having a track which comprises at least one roller path, in particular two roller paths extending in parallel, on whose running surface at least one track roller of the tracked chassis is movable during crawler operation.

Tracked chassis or crawler chassis comprise at least one revolving crawler track which is composed of a number of track links which are linked to one another in an articulated manner. At least one sprocket wheel provides the drive of the track, with said sprocket wheel being driven via at least one drive unit of the undercarriage and with the toothing of said sprocket wheel engaging into the track links for transferring force. In addition, at least one deflection pulley and a plurality of tension rollers and plain rollers are provided. The deflection pulley and the sprocket wheel are mounted at the front and at the back in the direction of travel, the plain rollers are arranged therebetween along the contact area and the tension rollers are supported disposed opposite the plain rollers in the region of the returning chain run. The deflection pulley, also called the idler, is typically displaceably fastened to the undercarriage and thereby provides the required track tension. The load of the vehicle can be introduced uniformly or non-uniformly into the resulting contact area of the crawler track over the plain rollers.

The contact surfaces between the plain rollers and the inwardly disposed surfaces of the individual track links are called a roller path, with the roller path being composed of the linked track links. Variants are known having one or more roller paths, with the second variant providing that each track link has two or more roller paths which extend in parallel and on which separate rims of a single roller run. The contact surface of the rims is called the running surface of the plain rollers.

Forces which occur are largely led off via the contact surfaces of the track drive into the ground contact area in machine operation so that the roller paths of the track links and plain rollers are in particular subject to high wear. The required lateral clearance between the plain rollers and the track links additionally promotes the wear since relative displacements or a tilt may produce a non-uniform force transmission and in particular high load peaks of the material can occur at points. This is in particular a problem on bumpy contact areas.

To stem the wear which occurs, relevant surfaces of the track or of the roller are hardened in the region of their running surfaces. However, in particular with a temporary high load at points, strain peaks can occur which can have the consequence of huge damage to the material due to crack formation.

SUMMARY OF THE INVENTION

The object of the present invention is therefore to keep the contact pressure between the plain rollers and the track as constant as possible and to minimize it as much as possible. The wear should thereby be reduced and the service life of the tracked chassis increased.

This object is achieved by a tracked chassis having the features herein. Advantageous embodiments of the tracked chassis are the subject of the description herein.

Starting from a tracked chassis for a work machine having a track which comprises at least one roller path, in particular at least two roller paths extending in parallel, on whose running surface at least one plain roller of the tracked chassis is movable during the crawler operation, in accordance with the invention the transverse section of the running surface of the at least one roller path of the track and the rolling-off running surface of the at least one plain roller are modified such that the contact pressure between both components is as small as possible and the wear which occurs can thereby be very largely reduced.

The transverse section is to be understood as the surface contour of the running surfaces transversely to the running direction. Provision is made in accordance with the invention in this respect that both the running surface of at least one roller path of the track and the running surface rolling off the latter of at least one roller path at least sectionally have a convex contour in a direction transversely to the running direction.

The at least sectionally convex contour of the transverse section partly increases the spacing between the two running surfaces of the plain roller or of the track. Overloads at points can be effectively avoided or reduced by the convex section. If the track is inclined with respect to the one or more plain rollers, i.e. the running surface of the plain roller does not lie on the track in a planar manner, a kind of rolling-off movement is effected due to the convex contour of the running surfaces, whereby load peaks at points, for example on the rising of the lateral running surface edge of a conventional linear running surface contour, are prevented.

It is particularly expedient if the running surface of the roller path of the track at the inner marginal region of the transverse section has a convex contour and the running surface of the plain roller rolling off it has a convex contour at the outwardly disposed marginal region of the transverse section. An ideal contact and corresponding loading of the running surfaces can thereby be provided during the working operation. An ideal, uniform force transmission is thereby not only achieved under ideal operating conditions with a plain roller lying in a planar and centered manner on the respective running surface of the track, but also for the case that the plain roller lies offset transverse to the running direction with respect to the track or rotates at an incline to the normal of the track running surface.

The convex contour can, for example, be arc-shaped, complex arcuate/complex arc-shaped (that is in the form of a complex arc). It is expedient if the two convex surfaces of the oppositely disposed running surfaces are matched to one another, i.e. both are arc-shaped, complex arc-shaped.

It is particularly preferred if the transverse total section of the running surface of at least one plain roller is composed of a complex portion and a linear portion. The transverse total section in this respect corresponds to the total width of the running surface, i.e. the surface portion which provides a possible contact during travel operation. The convex portion and/or linear portion is preferably a contiguous surface section; however, a plurality of linear and/or convex portions can likewise be present. It is particularly preferred if the ratio between the linear portion and the convex portion is determined in accordance with the following formula:

$$\frac{1}{10} \cdot R_{Horizontal} < R2_{Horizontal} < \frac{9}{10} \cdot R_{Horizontal} \text{ where}$$

$$R3_{Horizontal} = R_{Horizontal} - R2_{Horizontal},$$

where $R_{Horizontal}$ is the length of the transverse total section, $R2_{Horizontal}$ is the length of the linear portion and $R3_{Horizontal}$ is the length of the convex portion.

Since the transverse sectional surface is no longer planar, but describes an arc of curvature due to the convex portion, a vertical height offset results between the respective regions of the transverse section. It is particularly preferred if the maximum height offset $R3_{Vertical}$, i.e. the height offset at the outwardly disposed marginal region of the convex portion with respect to the linear portion is determined in accordance with the following formula:

$$\frac{1}{500} \cdot R_{Horizontal} < R3_{Vertical} < \frac{1}{10} \cdot R_{Horizontal}.$$

In a particularly preferred embodiment of the invention, the transverse total section of the running surface of the track is likewise composed of a convex portion and a linear portion. The convex portion and/or linear portion is preferably a contiguous surface section; however, a plurality of linear and/or convex portions can likewise be present. The following preferably applies $$P3_{Horizontal} = P_{Horizontal} - P2_{Horizontal},$$

where $P3_{Horizontal}$ is the length of the linear portion, $P_{Horizontal}$ is the length of the transverse total section and $P2_{Horizontal}$ is the length of the convex portion.

It is also expedient with this transverse total section if a region of the convex portion at the margin side has a height offset with respect to the linear portion, with the maximum height offset $P2_{Vertical}$ being defined in accordance with the following formula:

$$\frac{1}{500} \cdot P_{Horizontal} < P2_{Vertical} < \frac{1}{10} \cdot P_{Horizontal}.$$

As already explained above, an optimized relationship of the two running surfaces, i.e. of the running surface of the track and of the running surface of the plain roller, is expedient for an ideal force transmission. Provision is in particular made in this respect that the length of the transverse total section of the running surface of the track is larger than or equal to the length of the transverse total section of the running surface of the plain roller. Further preferably, the convex portion of the track is smaller in length than or equal to the length of the convex portion of the plain roller.

The track ideally comprises two roller paths which extend in parallel and on which counter-running surfaces of the plain roller roll off. It is expedient that the roller paths of the track or of a single track link which extend in parallel are designed symmetrically to the center axis.

In a particularly preferred embodiment of the invention, the at least one plain roller comprises a center flange which serves as a guide wheel for guiding the plain roller on the track; the center flange preferably runs in a provided recess which extends over the total track in the running direction. The side flanks of the center flange provide sufficient side support for guiding the roller. It is particularly preferred if the side flanks of the center flange are not linear, but are not clear (modified) to further limit the wear at the track side and/or at the plain roller side. The suitable choice of the angle of inclination facilitates the introduction of the center flange into the recess of the track if a complete raising of the track from the plain roller should occur in operation.

Provision can be made that the side flanks of the center flange are designed as convex at least sectionally in the radial direction or are characterized by a convex contour extent. The flank profile ideally has an alternating linear and convex contour in the radial direction. It is furthermore conceivable that the convex portions of the contour are characterized among one another by deviating radii of their arc extent.

It is particularly preferred if the side wall of the track recess disposed opposite the side flank of the center flange likewise has a convex contour at least sectionally. The side wall of the recess is in particular composed of a linear portion and a convex portion.

It is likewise conceivable for the side flanks of the center flange to comprise at least two linear sections which are separated from one another by at least one convex part. It is conceivable in this case that the two linear portions have different angles of inclination with respect to the vertical, preferably in the range between 0° and 50° or in the range between 0° and 30°. Ideally, a linear portion disposed closer to the center flange dome is inclined more with respect to the vertical than a linear portion disposed further inwardly in the radial direction of the plain roller. The angle of inclination of the linear portion disposed closest to the center flange dome is advantageously in the angular range between 0° and 50°.

It is furthermore conceivable that the linear portion of the side wall of the recess of the tracks is inclined with respect to the vertical; an angle is in particular selected in this respect whose amount is in the angular region between the angles of the two inclined linear portions of the side flank of the plain roller. The angle is ideally selected as identical to the angle of inclination of the oppositely disposed linear portion of the side flank of the center flange.

In accordance with an alternative embodiment, provision can be made that at least one running surface of the track is divided in the transverse direction into a plurality of segments which each have at least one linear portion, with convex portions preferably adjoining the linear portion at both sides. The running surface divided into a plurality of segments is to be understood as a running surface on which exactly one running surface of the plain rollers rolls off.

In addition to the tracked chassis in accordance with the invention, the present invention likewise comprises a work machine, in particular a crawler excavator or a crawler-mounted crane, having a tracked chassis in accordance with the present invention or with an advantageous embodiment of the invention. In this respect, the same advantages and properties obviously result for the work machine in accordance with the invention so that a repeat description will be dispensed with at this point.

BRIEF DESCRIPTION OF THE DRAWINGS

Further advantages and properties of the invention will be explained in more detail in the following with reference to an embodiment shown in the drawings. There are shown:

FIGS. 7A-7D: an overview of possible track designs of a tracked chassis, with FIG. 7A showing an asymmetrical design of roller paths, FIG. 7B showing a symmetrical design of roller paths, FIG. 7C showing a modified symmetrical design of roller paths, and FIG. 7D showing a top plan view of a possible track design.

DESCRIPTION OF THE PREFERRED EMBODIMENTS

Figure 1:
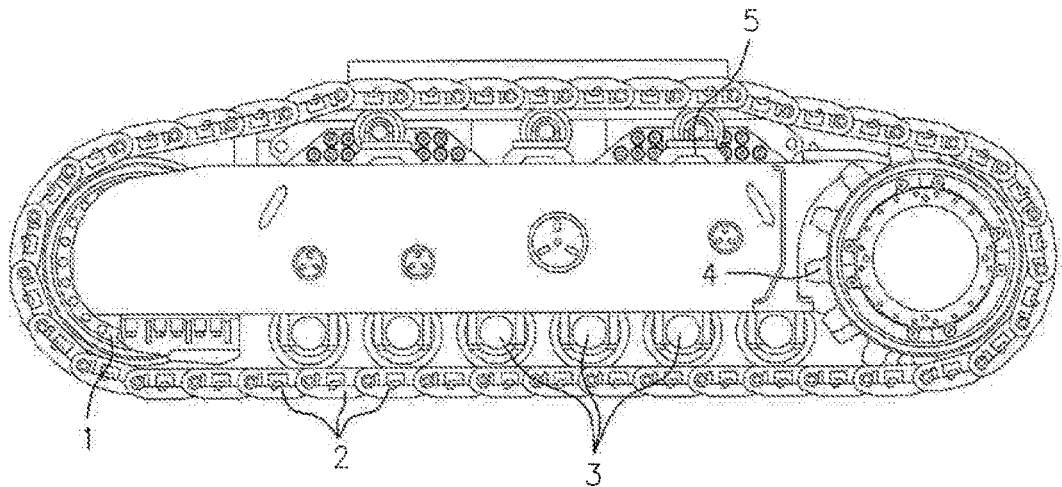
FIG. 1: a side view of the tracked chassis in accordance with the invention.

FIG. 1 shows a side view of the crawler drive in accordance with the invention for an earth-moving machine or a crawler-mounted crane. The crawler drive shown is fastened to the undercarriage of the work machine and serves the locomotion of the machine.

The chassis design comprises a driven sprocket wheel 4 which is driven via a drive mounted at the undercarriage and suitable for the locomotion. The idler 1 over whose periphery the crawler track runs is located at the end of the crawler drive at the left in the illustration. The idler 1 provides sufficient tensioning of the track, which is achieved by the movable support of the idler 1 at the undercarriage. The crawler track runs on the tension rollers 5 mounted at the upper edge of the superstructure to support the track sufficiently and to avoid sag.

A total of six plain rollers 3 are provided close to the ground along the contact area to introduce the machine weight, loads (e.g. equipment forces) or the contact pressure evenly over the contact area into the ground. In the embodiment shown, the plain rollers 3 are fastened at equal intervals between the sprocket wheel 4 and the idler 1; differences in the number and also with respect to the spacings of the plain rollers 3 from one another are easily conceivable. The crawler track is composed of individual track links 2 which are bolted together in an articulated manner via bolt connections.

Figure 2:
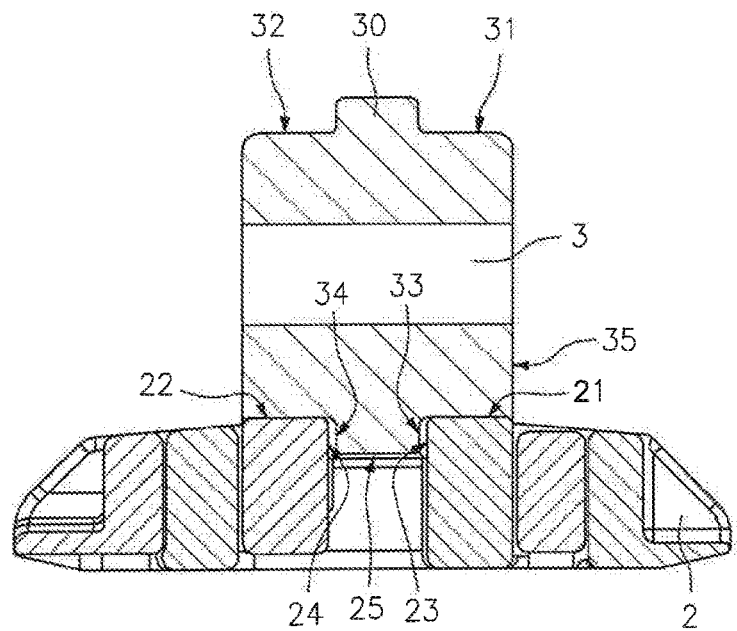
FIG. 2: a sectional representation through the tracked chassis of FIG. 1 in the region of the contact surface between the plain roller and the track link.

FIG. 2 shows a sectional representation of an individual plain roller 3 transversely to the running direction which runs off on a track link 2. Two separate running surfaces 31, 32 of the plain roller 3 can be recognized having the same diameter and an identical surface width. Both running surfaces 31, 32 run over the inner side of the individual track links 2 during the vehicle locomotion, that is they are carried by defined running surfaces 21, 22 on the inner side of the track links 2.

The center flange 30 of the plain roller 3 serves for forming of a guide wheel having a diameter increased in size with respect to the running surfaces 31, 32. The center flange engages into the recess 25 of the track link 2 which is continuous in the longitudinal direction and ensures a sufficient guidance of the roller 3 on the track by means of its side flanks 33, 34 which abut the side walls 23, 24 of the recess 25.

The present invention now describes a suitable modification of the running surface sections as well as optionally of the flanks 33, 34 or side wall contours 23, 24 to minimize loads for the track and the plain rollers 3 as much as possible. The modification of the running surface contours will be explained in the following with reference to the representation in FIG. 3 which sketches a part of the right hand running surface 31 of the plain roller 3 and the associated running surface 21 of the track link 2.

The transverse section of the track link 2, i.e. the total width of the running surface 21 transverse to the running direction will be termed $P_{Horizontal}$ in the following. This running surface is divided into a linear portion $P3_{Horizontal}$, i.e. a portion having a straight-line surface contour, and a convex portion $P2_{Horizontal}$, i.e. a portion with a convex contour extent. The convex portion $P2_{Horizontal}$ takes up the left hand marginal region of the total running surface $P_{Horizontal}$ and is consequently adjacent to the recess 25. The resulting running surface 21, i.e. the total width of the transverse section $P_{Horizontal}$ consequently corresponds to the sum of the linear portion and the convex portion $P2_{Horizontal} + P3_{Horizontal}$.

It can furthermore be recognized that, due to the convex portion $P2_{Horizontal}$, a height offset of the running surface results with respect to the linear portion $P3_{Horizontal}$, which adopts a value of $P2_{Vertical}$. The maximum value $P2_{Vertical}$ is consequently present at the inner end of the convex portion $P2_{Horizontal}$. The transition of the transverse section $P_{Horizontal}$ into the side wall 23 takes place over a rounded corner having a constant radius whose transverse length is designated by $P1_{Horizontal}$. The same applies to the outer edge of the running surface 21 having the transverse length $P4_{Horizontal}$. The regions $P4_{Horizontal}$ and $P1_{Horizontal}$ can alternatively also be configured as convex, in particular as arcuate or in the manner of a basket bottom. The hatched region represents the permitted radius range of the convex portion $P2_{Horizontal}$. The convex portion $P2_{Horizontal}$ can comprise a constant radius, be of a complex shape/arc-like shape.

Figure 3:
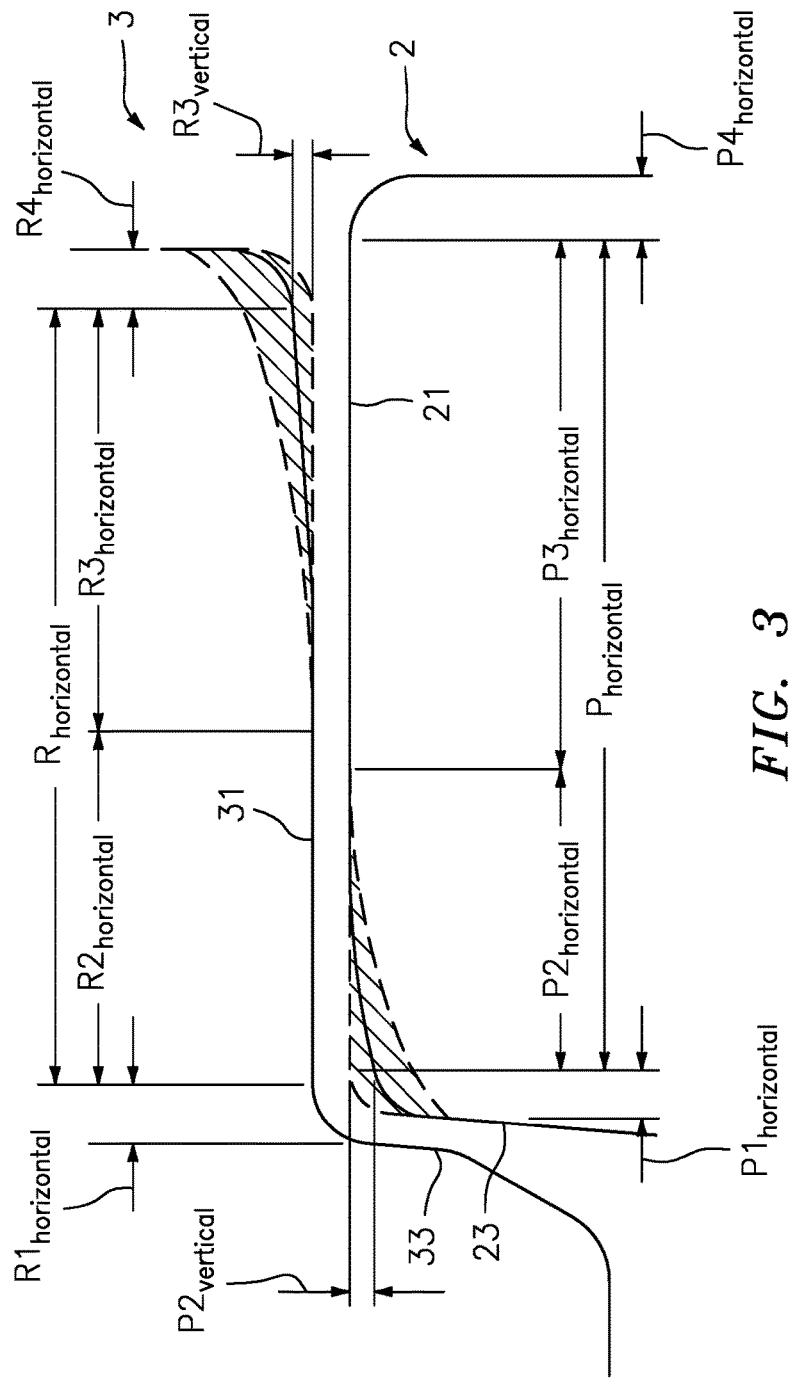
FIG. 3: a contour sketch of the running surfaces of the roller and of the track.

FIG. 3 furthermore shows the contour section of the running surface 31 of the plain roller 3 running off on the described running surface. This transverse section $R2_{Horizontal}$ is also composed of a linear portion $R2_{Horizontal}$ and a convex portion $R3_{Horizontal}$. The convex portion is in this respect provided at the outer marginal region of the transverse section $R_{Horizontal}$. The likewise resulting height offset of the transverse section is designated by the value $R3_{Vertical}$ which is measured at the outer end region of the convex section $R3_{Horizontal}$. As with the track link 2, the transition to the outer side flank 35 is also rounded; the transverse length of the rounding is designated as $R4_{Horizontal}$. The transition of the linear portion $R2_{Horizontal}$ to the side flank 33 of the center flange takes place with a constant radius, with the transverse length of the transition being designated by $R1_{Horizontal}$. The parallel running surfaces 22, 32 are axially symmetrical. The regions $R4_{Horizontal}$ and $R1_{Horizontal}$ can alternatively also be configured as convex, in particular as arcuate or complex arcuate. The hatched region represents the permitted radius range of the convex portion $R3_{Horizontal}$. The convex portion $R3_{Horizontal}$ can comprise a constant radius and be of a complex shape/arc-like shape The plain roller is preferably axially symmetrical, at least with respect to the configuration of the center flange 30 and of the running surfaces 31, 32.

The dimensioning of the linear portions or convex portions of the respective running surfaces 21, 22, 31, 32 is fixed by the following formulas:

$$\frac{1}{10} \cdot R_{Horizontal} < R2_{Horizontal} < \frac{9}{10} \cdot R_{Horizontal}$$

$$R3_{Horizontal} = R_{Horizontal} - R2_{Horizontal}$$

$$\frac{1}{500} \cdot R_{Horizontal} < R3_{Vertical} < \frac{1}{10} \cdot R_{Horizontal}$$

$$P_{Horizontal} \geq R_{Horizontal}$$

$$P2_{Horizontal} \leq R2_{Horizontal}$$

$$P3_{Horizontal} = P_{Horizontal} - P2_{Horizontal}$$

$$\frac{1}{500} \cdot P_{Horizontal} < P2_{Vertical} < \frac{1}{10} \cdot P_{Horizontal}$$

$$R1_{Horizontal} \leq 20 \text{ mm}$$

$$R4_{Horizontal} \leq 20 \text{ mm}$$

$$P1_{Horizontal} \leq 20 \text{ mm}$$

$$P4_{Horizontal} \leq 20 \text{ mm}$$

In accordance with the present invention, however, not only the running surfaces 21, 22, 31, 32 are to be modified, but also the contour of the center flange 30 of the plain roller 3 and of the corresponding recess 25 of the track link 2.

Figure 4:
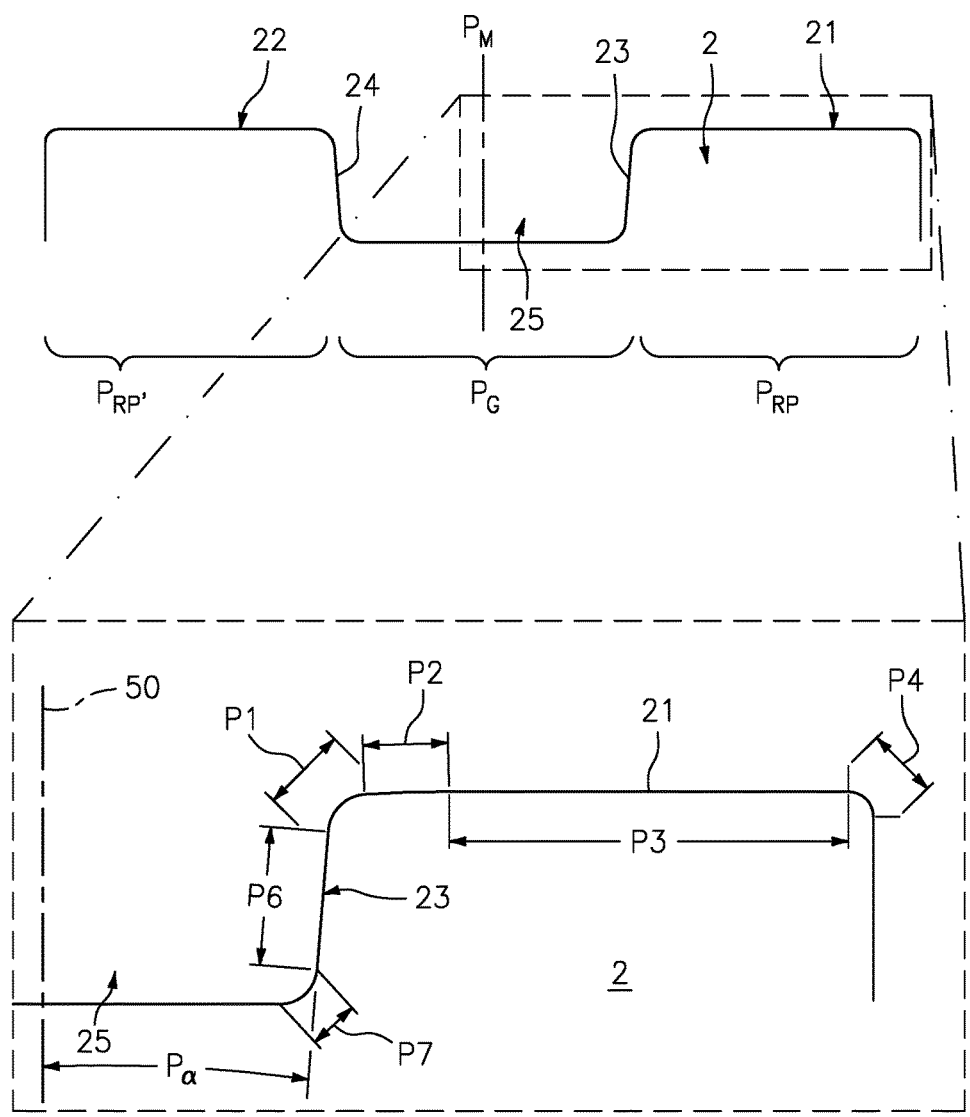
FIG. 4: a sketch of the running surface contour of the track.
Figure 5:
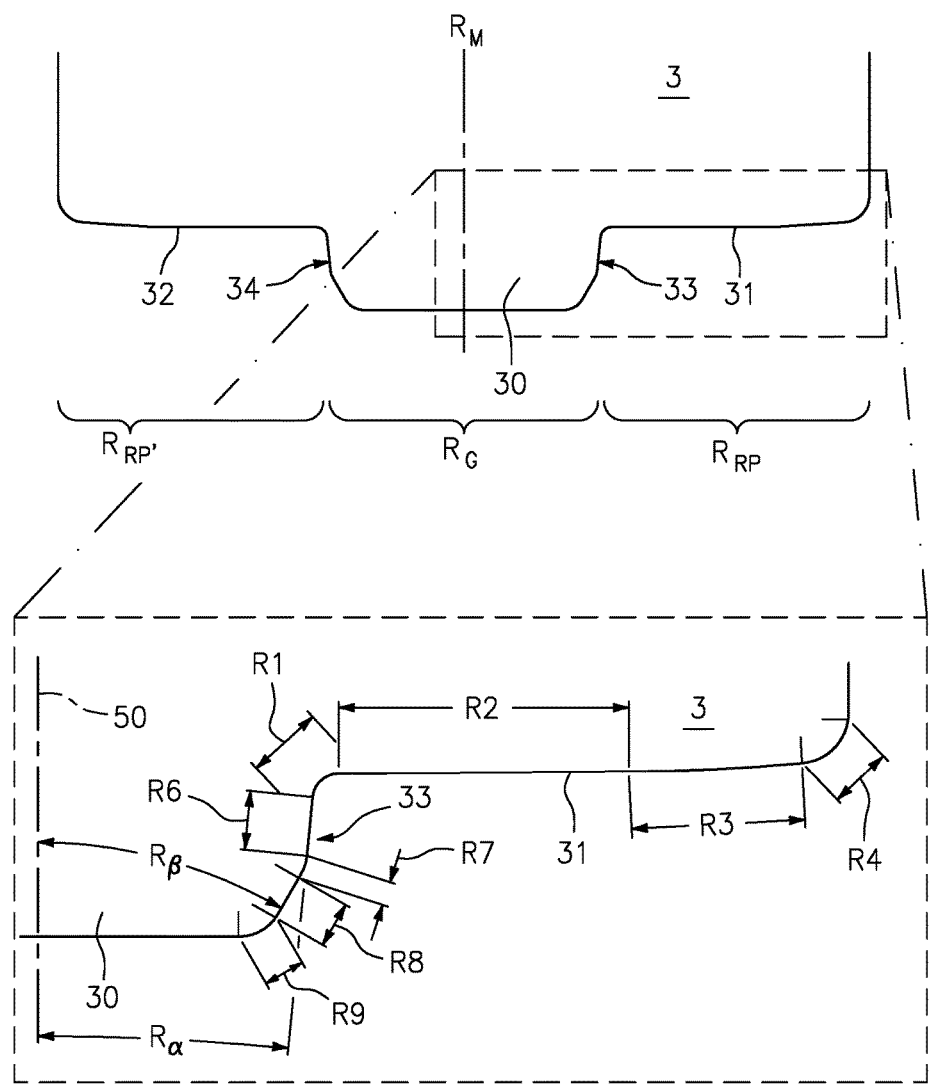
FIG. 5: a sketch of the running surface contour of the plain roller.

In FIG. 4, $P_M$ denotes a central plane or line within the link 2, with $P_g$ denoting the central portion encompassed by recess 25 and $P_{RP'}$ and $P_{RP}$ denoting lateral portions of respective running surfaces 22 and 21 on either side of recess 25. $P_4$ denotes the transition region on the opposite outer side of link 2 from transition region $P_1$. In FIG. 5, $R_M$ denotes a central plane or line within the roller 3, with $R_g$ denoting the central portion encompassed by central flange 30 and $R_{RP'}$ and $R_{RP}$ denoting lateral portions of respective running surfaces 32 and 31 on either side of central flange 30. $R_4$ denotes the corner on the opposite outer side of roller 3 from corner $R_1$.

The specific shape of the side flank of the recess 25 can be seen from FIG. 4. For reasons of simplicity, the index "horizontal" was omitted in the Figure representation. It can be recognized in this respect that a linear portion P6, which opens into the base of the recess 25 over the curved region, adjoins the transition region P1 of the convex portion P2 to the side wall 23. The region P7 can likewise be a curve with a constant radius or can have a complex arcuate design. The linear portion P6 is inclined at an angle $P_\alpha$ with respect to the vertical 50.

The side flank 33 of the center flange 30 of the plain roller 3 is shown in FIG. 5. The linear portion R2 of the running surface 3 merges over the rounded corner R1 into a linear portion R6 of the side flank 33 of the center flange 30. A first convex portion R7 adjoins the linear portion R6; it again merges into a linear portion R8 and finally ends in the convex portion R9 which directly adjoins the dome of the center flange 30. The convex regions R6, R8 can also have a constant radius of curvature or can also be of an arcuate design.

It can furthermore be recognized that the linear portions R6, R8 adopt different angles of inclination $R_\beta$, $R_\alpha$ with respect to a vertical 50. The angle of inclination $R_\alpha$ of the linear portion R6 is selected to be smaller than the angle of inclination $R_\beta$ of the linear portion R8. Rules for the dimensioning of the corresponding angle of inclination were fixed as follows:

$$0° < R_\alpha < 30°$$

$$0° < R_\beta < 50°$$

The angle of inclination $P_\alpha$ of the side part 23 of the track link 2 is typically dimensioned equal in amount to the angle of inclination $R_\alpha$ of the plain roller 3.

Figure 6A:
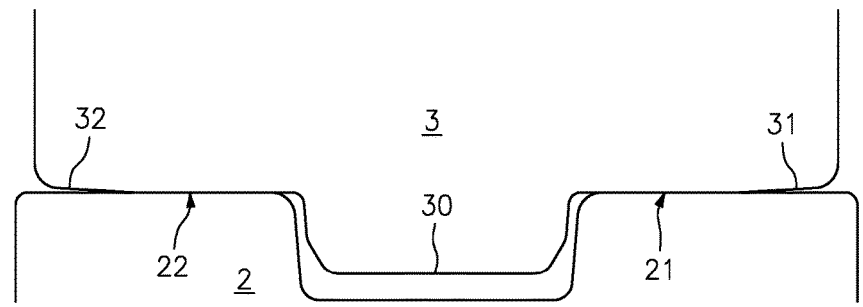
FIGS. 6A-6C: various sketches of the running surface contours under different operating conditions, with FIG. 6A showing a cross-section through the contact surface of the roller and track link, FIG. 6B showing the cross-section where the roller is laterally offset on the track link, and FIG. 6C showing the center flange of the roller displaced to the left and the track pressed upwardly towards the roller at the left.

An understanding of the advantageous characteristic operating properties of the modified contour of the plain roller 3 and of the track link 2 will be given with reference to the Figure representations 6a, 6b, 6c. The representation of FIG. 6a shows a cross-section through the contact surface of the roller 3 and of the track link 2. The plain roller 3 in this respect lies centrally on the track link 2, i.e. the center flange 30 engages centrally into the recess 25.

The following statements are made for the example of the running surfaces 21, 31 and apply equally to the running surfaces 22, 32 due to the axially symmetrical design of the track link 2 or of the plain roller 3. The main contact surface between the plain roller 3 and the track link 2 is achieved by the contacting of both linear portions R2, P3. The spacing between the two running surfaces is increased in these regions by the convex portions R3, P2. An optimum contact surface between the two components thereby results which allows an optimum flow of forces. The occurrence of load peaks at points can consequently be avoided.

Figure 6B:
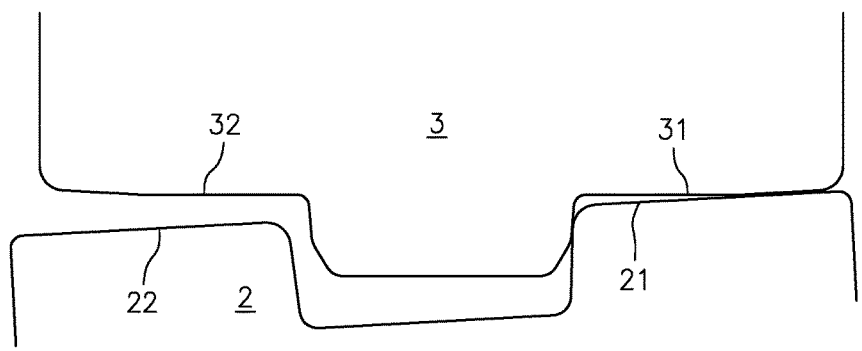

FIG. 6b shows an operating situation in which the plain roller 3 lies laterally offset on the track link 2. The right hand side flank 33 of the center flange 30 thereby contacts the side wall 23 of the recess 25. Furthermore, due to external influences, the track is pressed upwardly on the side shown at the right in the drawing so that the plain roller 3 runs obliquely on the track and the left hand running surface 32 rises from the running surface 22 of the track link. Due to the contour modification in accordance with the invention with the convex portions P2, R3, the running surface 31 can roll off to the right on the running surface 21 without load peaks arising on the running surface 21. The convex portion R3 contacts the linear portion P3 of the track link 2. The specific dimensioning of the convex portion R3 is selected in this respect such that the resulting contact pressure does not exceed or only slightly exceeds the regular contact pressure of the operation situation in accordance with FIG. 6a.

Figure 6C:
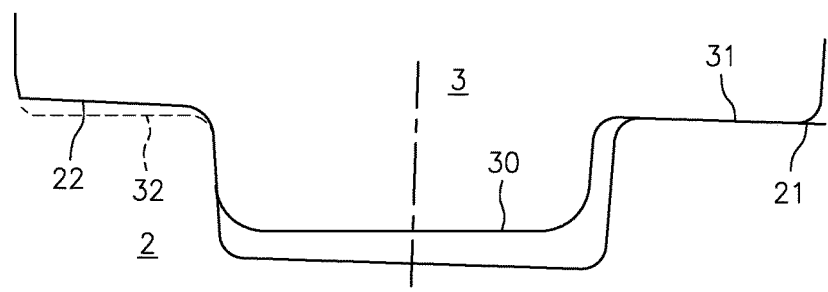

In FIG. 6c, the center flange 30 is displaced to the left and the track is pressed upwardly in the direction of the plain roller 3 at the left hand side due to the characteristic at the site of use. The convex contour of the two running surfaces 21, 31 also provides a uniform load and contact here; the plain roller is in contact with the convex portion P2 of the track link 2 by means of the linear portion R2.

The plain roller 3 can optionally completely lose contact with the track link 2 during working operation. The specific embodiment of the region R8, in particular the more acute tapering of the center flange 30 due to the larger angle of inclination $R_\beta$ of the center flange 30 allows a reliable new engagement of the center flange 30 in the recess 25. At the start of the engagement, the region R8 contacts the region P1 of the track link.

A further advantage of the embodiment in accordance with the invention comprises the fact that the linear portions P6 and R6 of the track link 2 or of the plain roller 3 are in parallel with one another and thus allow an areal contact between the center flange and the side wall of the recess 25. The wear which occurs in this region can thereby be further limited.

FIG. 7 shows different track designs in which the roller paths 21, 22 extending in parallel are composed of individual track links 2 in different manners. FIG. 7a shows an asymmetrical design of the roller paths of a single track link 2. It is thereby achieved that the transition gaps between individual track links 2 lie offset in the longitudinal direction to reduce vibrations during the rolling-off of the roller 3. FIG. 7b shows a symmetrical design with symmetrical or identical track links 2. The variant of FIG. 7c shows a slight modification with respect to the symmetrical design of FIG. 7b. In this respect, the individual running surfaces 21, 22 of an individual track link are admittedly of identical design, but are slightly offset in the running direction to realize the aforesaid advantages of the asymmetrical design. However, the resulting wear at the track links 2 can be considerably reduced for all variants of FIGS. 6a to 6c by means of the contour modification in accordance with the invention.

Figure 8:
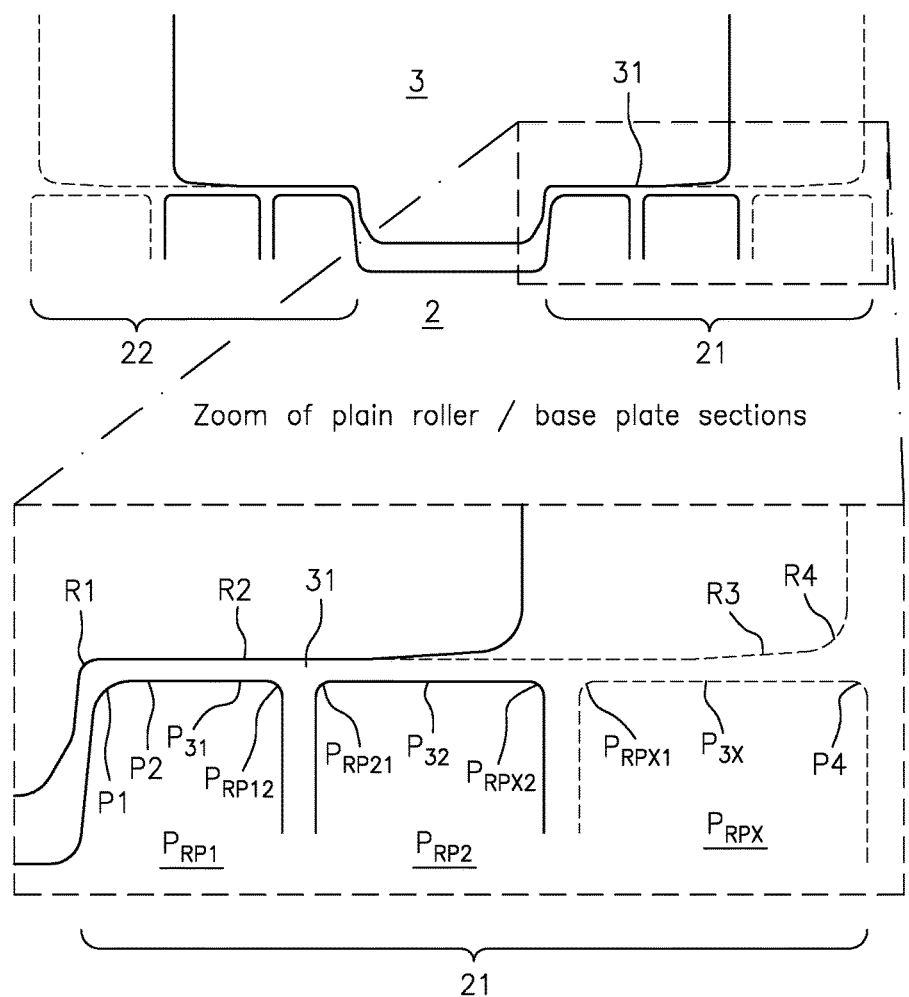
FIG. 8: an alternative embodiment of a track link with divided running surfaces.

FIG. 8 shows a further embodiment whose running surface is divided into two or more running surface segments $P_{RP1}$ to $P_{RPX}$. The running surface 31 of the plain roller 3 then rolls off simultaneously on two or more roller paths $P_{RP1}, P_{RP2}, P_{RPX}$. The linear portion of the running surface 21 is divided in this case in linear portions $P_{31}, P_{32}, P_{3X}$ of the running surface segments $P_{RP1}$ to $P_{RPX}$. Convex portions $P_2, P_{RP12}, P_{RP21}, \ldots, P_{RPX2}, P_{RPX1}, P_4$ adjoin at both sides of the linear portions of a running surface segment.

The invention claimed is:

1. A tracked chassis for a work machine having a track which comprises a roller path on whose running surface at least one roller of the tracked chassis is movable during crawler operation, wherein
  the running surface of the roller path of the track has a recess (25), the running surface of the at least one roller has a flange (30) received in the recess (25) and the running surfaces of the roller path and at least one roller each have a transverse section on opposite sides of the respective flange (30) and recess (25) and having a convex or concave contour immediately adjacent the respective flange (30) and recess (25), an outermost convex contour, and being straight between the outermost contour and the contour immediately adjacent the respective flange (30) and recess (25).

2. The tracked chassis in accordance with claim 1, wherein the running surface of the roller path of the track at an inner marginal region of the transverse section has a convex contour and the running surface of the roller has a convex contour at an outwardly disposed marginal region of the transverse section.

3. The tracked chassis in accordance with claim 1, wherein the convex contour of the roller and/or of the track is arcuate and/or complex arcuate.

4. A tracked chassis for a work machine having a track which comprises a roller path on whose running surface at least one roller of the tracked chassis is movable during crawler operation, wherein
  the running surface of the roller path of the track and the running surface of the at least one roller have a transverse section with a sectionally convex contour, and
  the length $R_{Horizontal}$ of the transverse section of the surface of the at least one roller is composed of a linear portion $R2_{Horizontal}$ and a convex portion $R3_{Horizontal}$, where the following formula applies:

$$\frac{1}{10} \cdot R_{Horizontal} < R2_{Horizontal} < \frac{9}{10} \cdot R_{Horizontal} \text{ where}$$

$$R3_{Horizontal} = R_{Horizontal} - R2_{Horizontal}.$$

5. The tracked chassis in accordance with claim 4, wherein due to the convex contour of the convex portion $R3_{Horizontal}$, a height offset $R3_{Vertical}$ of the transverse section $R_{Horizontal}$ at a margin side results with respect to the linear contour $R2_{Horizontal}$ of the transverse section $R_{Horizontal}$, where the following formula applies:

$$\frac{1}{500} \cdot R_{Horizontal} < R3_{Vertical} < \frac{1}{10} \cdot R_{Horizontal}.$$

6. A tracked chassis for a work machine having a track which comprises a roller path on whose running surface at least one roller of the tracked chassis is movable during crawler operation, wherein
  the running surface of the roller path of the track and the running surface of the at least one roller have a transverse section with a sectionally convex contour, and
  the length $P_{Horizontal}$ of the transverse section of at least one running surface of the track is composed of a linear portion $P3_{Horizontal}$ and a convex portion $P2_{Horizontal}$, where the following formula applies:

$$P3_{Horizontal} = P_{Horizontal} - P2_{Horizontal}.$$

7. The tracked chassis in accordance with claim 6, wherein due to the convex contour of the convex portion $P2_{Horizontal}$, a height offset $P2_{Vertical}$ of the transverse section $P_{Horizontal}$ at a margin side results with respect to the linear contour $P3_{Horizontal}$ of the transverse section $P_{Horizontal}$, where the following formula applies:

$$\frac{1}{500} \cdot P_{Horizontal} < P2_{Vertical} < \frac{1}{10} \cdot P_{Horizontal}.$$

8. The tracked chassis in accordance with claim 6, wherein the following applies to the relationships of the running surface of the track and of the running surface of the roller:

$$P_{Horizontal} \geq R_{Horizontal},$$

$$P2_{Horizontal} \leq R2_{Horizontal}.$$

9. The tracked chassis in accordance with claim 1, wherein at least one running surface of the track is divided into a plurality of running surface segments having a linear portion in the transverse direction, with convex portions adjoining the linear portions at both sides.

10. The tracked chassis in accordance with claim 1, wherein the at least one roller comprises a center flange for guiding the plain roller on the track, with side flanks of the center flange having a convex contour at least sectionally in the radial direction.

11. The tracked chassis in accordance with claim 10, wherein a flank section has a contour alternating linearly and convexly in the radial direction.

12. The tracked chassis in accordance with claim 11, wherein each said side flank comprises at least two linear sections which are separated by at least one convex part, with the linear portions having different angles of inclination with respect to the vertical, between 0° and 50° or 0° and 30°, and with the linear portion disposed closer to the center flange dome having a greater inclination.

13. The tracked chassis in accordance with claim 12, wherein
  at least one running surface of the track is divided into a plurality of running surface segments having a linear portion in the transverse direction, with convex portions adjoining the linear portions at both sides, and the oppositely disposed side wall of the recess of the track receiving the center flange has a convex contour at least sectionally and is composed of a linear portion and a convex portion.

14. The tracked chassis in accordance with claim 13, wherein the linear portion of the side wall of the recess is inclined with respect to the vertical, at an identical angle to the oppositely disposed linear portion of the side flank of the center flange.

15. A crawler excavator or a crawler-mounted crane, having the tracked chassis in accordance with claim 1.

16. A tracked chassis for a work machine having a track which comprises a roller path on whose running surface at least one roller of the tracked chassis is movable during crawler operation, wherein the running surface of the roller path of the track and the running surface of the at least one roller have a transverse section with a sectionally convex contour, the running surface of the roller path of the track at an inner marginal region of the transverse section has a convex contour and the running surface of the roller has a convex contour at an outwardly disposed marginal region of the transverse section, and the convex contour of the roller and/or of the track is arcuate and/or complex arcuate.

* * * * *